(12) United States Patent
Stork et al.

(10) Patent No.: US 6,275,174 B1
(45) Date of Patent: Aug. 14, 2001

(54) INPUT DEVICE AND METHOD FOR REMOTE CONTROL OF AUDIO AND VIDEO RECORDING AND REPRODUCING SYSTEMS, AND PRESENTATION DEVICE UTILIZING SAME

(75) Inventors: Alexander Stork, Steinstr. 30, D-61440 Oberursel; Klaus-Dieter Stork, Oberursel; Peter Stock, Bad Camberg, all of (DE)

(73) Assignee: Alexander Stork (DE)

( * ) Notice: Subject to any disclaimer, the term of this patent is extended or adjusted under 35 U.S.C. 154(b) by 0 days.

(21) Appl. No.: 09/167,900

(22) Filed: Oct. 7, 1998

(30) Foreign Application Priority Data

Oct. 10, 1997 (DE) .............................. 197 44 941

(51) Int. Cl.$^7$ ........................... H03K 17/94; H03M 11/00
(52) U.S. Cl. ................................................ 341/20
(58) Field of Search ...................... 341/20, 176; 345/156, 345/161, 158, 169, 339, 340, 341; 353/122, 121; 74/471 XY; 200/4

(56) References Cited

U.S. PATENT DOCUMENTS 5,883,346 * 3/1999 Stocken ..................................... 200/4

FOREIGN PATENT DOCUMENTS

| | | |
|---|---|---|
| 42 33 238 A1 | 4/1994 | (DE) . |
| 297 02 656 U1 | 6/1997 | (DE) . |
| A1-19610344 | 9/1997 | (DE) . |
| 196 43 201 A1 | 4/1998 | (DE) . |
| WO 97/21168 | 6/1997 | (WO) . |

* cited by examiner

Primary Examiner—Timothy Edward, Jr.
(74) Attorney, Agent, or Firm—Haynes and Boone, LLP (57) ABSTRACT

An input device for remote control of simple and combined recording and reproducing systems for pictures and sound as well as of presentation devices, which comprises: a housing, a voltage supply, at least one operating element, a signal element and switching elements, which deal with the actuation of the at least on operating element and cause the signal element to issue a signal corresponding to the actuation. The input device for the remote control can be actuated by the operator with one hand, and provided with a shape ergonomically adapted for holding in a hand, and only has one main operating element (H) which is operated in two planes separated from one another by a rotary movement (3, 4) and a linear movement (1, 2) respectively, and method of remote control of at least one electronic presentation device operated by a presenter. As a result the presenter can present to an audience a set of contents organized by pages and the control of the at least one electronic presentation device takes place using the previously described input device, wherein the presenter receives direct feedback through the at least one presentation device as to the state of the electronic presentation, so that he can control the electronic presentation without visually checking the input device.

16 Claims, 6 Drawing Sheets

Example 1

Example 2

Example 3

Example 4

FIG. 4

INPUT DEVICE AND METHOD FOR REMOTE CONTROL OF AUDIO AND VIDEO RECORDING AND REPRODUCING SYSTEMS, AND PRESENTATION DEVICE UTILIZING SAME

BACKGROUND OF THE INVENTION (1) Field of the Invention

The present invention relates to an input device and method for remote control of simple and combined recording and reproducing systems for pictures and sound, as well as presentation devices utilizing same.

(2) Description of the Prior Art

A presentation consists of various audio and video displays which are presented to an audience by one or more presenters through various reproducing systems for pictures and sound and/or other presentation devices (e.g. light spots, controlled models).

A typical electronic presentation consists of the following components:

1. a finite number of pages or units, which can be regarded as analogous to a stack of overhead projection transparencies, wherein these can assume all visually perceptible forms, be enhanced by audio information or other stimuli perceptible by humans and can alter their content in the course of time (e.g. still pictures, such as pages of text or image pages; motion pictures, such as animations or video);
2. an arrangement or relationship of the pages or units to one another, wherein, in general, a linear sequence should be established and wherein a variation of the presentation sequence can be facilitated by additional associative information;
3. an input device available to each presenter and by means of which he can call up the desired pages or units of the presentation (e.g. computer mouse and keyboard); and
4. an electrically or electronically controlled projection device for representing the contents, which makes the visual information visible to the audience, wherein additional, further electrically or electronically controlled presentation devices can be used to reproduce audio information and/or further perceptible stimuli.

Various input devices are known from the prior art, which are used for operation and for remote control of simple and combined recording and reproducing apparatus for sound and pictures as well as of presentation devices. These can be envisaged and used in principle for control of electronic presentations. The most well-known example is the computer mouse and pointer to enable commands to be executed through virtual buttons, without the troublesome input of key codes. The customary operating systems have a graphical, mouse-controlled operating interface (GUI= graphical user interface) and most software is based thereon. In relation to electronic presentations, most presentation software is based on the GUI concept. Developments are based as a rule on giving the presenter a convenient input device in the hand, with which he can move about freely and effect inputs to the electronic presentation simultaneously. These input systems are based on the computer mouse, and can be connected to the same port and merely control the already existing mouse pointer of the computer system or issue signals for the left and right mouse buttons.

There are variations in the mechanical/form technology implementation. For example, "trackballs" have been used that are greatly reduced in size and the mouse pointer was controlled with the thumb. The apparatus was hidden in the hand and was connected to a computer by a cable. In the meantime, use has been made of IR and radio technology and "mice" provided which are independent of position. These "mice" are based as a rule on the trackball or the known mouse stick of laptops. (By pressing on a disk or moving a knob in one direction, the mouse pointer moves in the selected direction, usually with progressive speed). Manufacturers of high performance LC data projectors offer as standard a remote control (IR as the predominant transmission technique) which offers access to all the features of the projector (e.g. input signal switching between video or computer, contrast, etc.) and also includes an integral mouse control. The integrated mouse control corresponds to the previously mentioned characteristics. There are extensions of special remote controls for electronic presentations, e.g. a programmable operating field: Each key can be assigned a particular action, e.g. start (presentation) program, view video, start slide show. Here also a mouse is again integrated, in order to control the started software. Furthermore there are many external computer peripherals which function as input devices and touch the field spoken of here only in part.

Present developments which can also be used for control of electronic presentations are for the most part of technologically orientated design. For example, the presentation software MS-Powerpoint is controlled with the mouse (or devices based on this pointer device). However this "point-and-click" method proves a problem in the control, since one has to steer to the corresponding button with the mouse arrow before initiating a function. This is all the more difficult when the arrow is not seen directly, it has progressive speed or say buttons cannot be recognized as such by the presenter and thus important contents are passed over. Because of increased concentration on the control, the presenter loses capacity for communication of the contents.

Other attachments concentrate on the control of LC projectors and offer a supplementary function for mouse control. Accordingly there are too many buttons/functions on the remote control. Most are unnecessary for the presentation and are prone to error operations. Such remote controls are not dissimilar to products for controlling televisions sets and are not suitable for single hand control of an electronic presentation on account of too many elements and a clumsy appearance. Computer-illiterate users in particular often "fall down" here. With mouse-based presentations the mouse pointer can even prove a distraction, since it has to be located somewhere on the screen or projection. The mouse cursor is only of very restricted use as a pointer instrument— it is as a rule too small and does not stand out enough from the picture background. Large pointers minimize this problem but distract the attention.

There are further problems in utilizing conventional devices. for example the keyboard is at a fixed position and hard to operate in the darkened room and the presenter has to direct his eyes on to the keyboard in order to actuate it. Also, the mouse (trackball, joystick) requires precise control on to the target by the presenter, in two axes, which the presence of the mouse arrow presumes and diverts the attention of the presenter from contact with the audience. Moreover, it provides too few control possibilities. Although a combination of keyboard and mouse (trackball, joystick) does provide control possibilities, it is too complex in operation. Further, portable operating consoles suffer from too many operating elements causing keyboard problems.

All components referred to above frequently lead to errors in operation in a presentation, which can make the audience doubt the quality of the presentation as well as the qualifications of the presenter. It follows from this that the combination of input apparatus and control software with these conventional technical means is not good enough for the special requirements of a presentation situation.

SUMMARY OF THE INVENTION

It is the object of the present invention to provide an input device of the type cited above, which is as simple as possible and can be operated by the operating person without visual checking and in which error conditions from erroneous actuation of a false key are practically ruled out. Furthermore an objective of the invention is to provide a method which describes how such an input device according to the invention can be used in an electronic presentation.

To this end the operation of the electronic presentation is as simple in the ideal case as operation of a slide projector, or only not substantially more complex. The operating console for the electronic presentation is operable with a single hand and should not substantially restrict the presenter's gesticulations. In addition rapid putting down and picking up again with only one hand is possible. The most important operating functions are capable of initiation by the thumb or forefinger, since these fingers are the best designed for fine motor control. Unerring selection of pages is possible and there should be no "hidden" functions. Even after a longer pause the presenter must be in a position to proceed with the presentation without studying a handbook.

The presenter is able through interactivity to control the page contents, so that the projection relates to his words— and he does not have to formulate his words according to given structures of the presentation. All above cited aspects need not be restricted in any way by currently normal presentation environments—thus for example darkened rooms, presence of IR sources and the like.

In order to meet this object an input device according to the pre-characterizing part of claim 1 is implemented as follows. The input device has a housing, a voltage supply, at least one operating element, a signal element and switch elements which deal with the actuation of the at least one operating element and cause the signal element to issue a signal corresponding to the actuation. The input device for the remote control is to be actuated by the operator with one hand. Furthermore the shape of the housing is ergonomically adapted to the shape of the human hand, for holding in one hand. The input device comprises only one main operating element, which is operated in two planes separated from one another, through a rotary movement and a linear movement respectively.

A method is provided for remote control of at least one electronic presentation device operated by a presenter, wherein the presenter presents a set of contents organized by pages and wherein this method is distinguished in the control of the at least one electronic presentation device takes place using an input device according to any of claims 1 to 14, wherein from a set in which the contents organized by pages are arranged unidimensionally, the pages can only be controlled according to the unidimensional arrangement and the presenter receives direct feedback through the at least one presentation device as to the state of the electronic presentation, so that he can control the electronic presentation without visually checking the input device.

The input device is set up with operating software in a form which facilitates the operation of an electronic presentation. This software produces the linking of the individual pages or units of the presentation and suitably converts the control commands sent from the input device. No mouse pointer is required.

All system adjustments, such as for example the contrast of the projector, are effected once before the presentation. Only the actually necessary functions are represented on the input apparatus, so that erroneous operation is excluded. (A Marketing Manager wants to communicate his contents and not look for buttons, or even experience the distress of pressing them incorrectly).

The main operating element implemented as a control knob reduces the input possibilities to a rotary movement and a linear movement, which are effected in two planes clearly separated from one another and thus cannot be interchanged. This control requires far less skill of the presenter than the simultaneous two-dimensional control of a pointer via a trackball or mouse. "Targeting" disappears, since there is no longer a mouse pointer. In the presence of branching options or other functions the presenter is given optical evidence of their availability. By turning the control knob all options of a page are activated cyclically and can then be selected/triggered by knob pressure. Should the presenter no longer be clear as to all functions on a page, he only needs to carry out a complete cycle. With branching possibilities he can use activation of any kind of point as a pointer possibility (instead of a laser) and only branch thereto when necessary in order to go more deeply into the corresponding part. Page contents can be changed with the control knob, thus for example a parameter in a diagram or the direction of view in a virtual 3D world. The presenter himself can operate the electronic presentation himself because of the elimination of fault conditions and reduced range of functions. This means that he himself is in control and does not have to pass this to a second presenter (operator). The operator could make a false operation at the decisive moment, since he never knows precisely what the presenter is thinking of saying. Furthermore, a discussion would be necessary in front of the audience should the presenter suddenly want to show a page departing from the standard sequence.

Further advantages which are obtained are that a specially shaped ergonomic input device adapted to the shape of the human hand is made available.

The input device has the following ergonomic advantages:
1. Single-handed operation of the primary functions is possible.
2. Blind operation of all functions is possible.,
3. The input device can be handled equally well by right-handed and left-handed persons.,
4. The finger best designed for fine motor control, index finger and thumb, deal with the most important functions.
5. The presenter is not forced to hold the input device always in the hand, since operation of the knob for switching on the picture is also possible when the apparatus is for example standing on a table.

A further advantage of one embodiment of the invention is that separate function keys are available for secondary functions, e.g. dimming, triggering events, selecting language version.

In the optimum case of radio transmission the system is insensitive to interference compared with IR remote control or to covering the reception unit.

The laser pointer offers more rapid and precise pointing. The point on the screen stands out much more clearly from the picture than a mouse pointer. Furthermore the presenter makes a gesture when pointing with a laser, which guides the view of the audience to the picture location.

Since in the meantime it has become possible to play videos through a PC, switching over the projector for showing videos is no longer necessary. The system provides for use of video, virtual reality applications or animations, without the operating becoming more complex.

The giving of a presentation by a single person is possible with the input device according to the invention, who can initiate the primary functions with one hand and blind.

The solution put forward here can vary in its technical implementation; e.g. which way the data transmission from the operating unit to the computer takes place plays a secondary role.

BRIEF DESCRIPTION OF THE DRAWINGS

Embodiments of the invention will now be explained in more detail with reference to the accompanying drawings, in which.

DESCRIPTION OF THE PREFERRED EMBODIMENTS

Figure 1A:
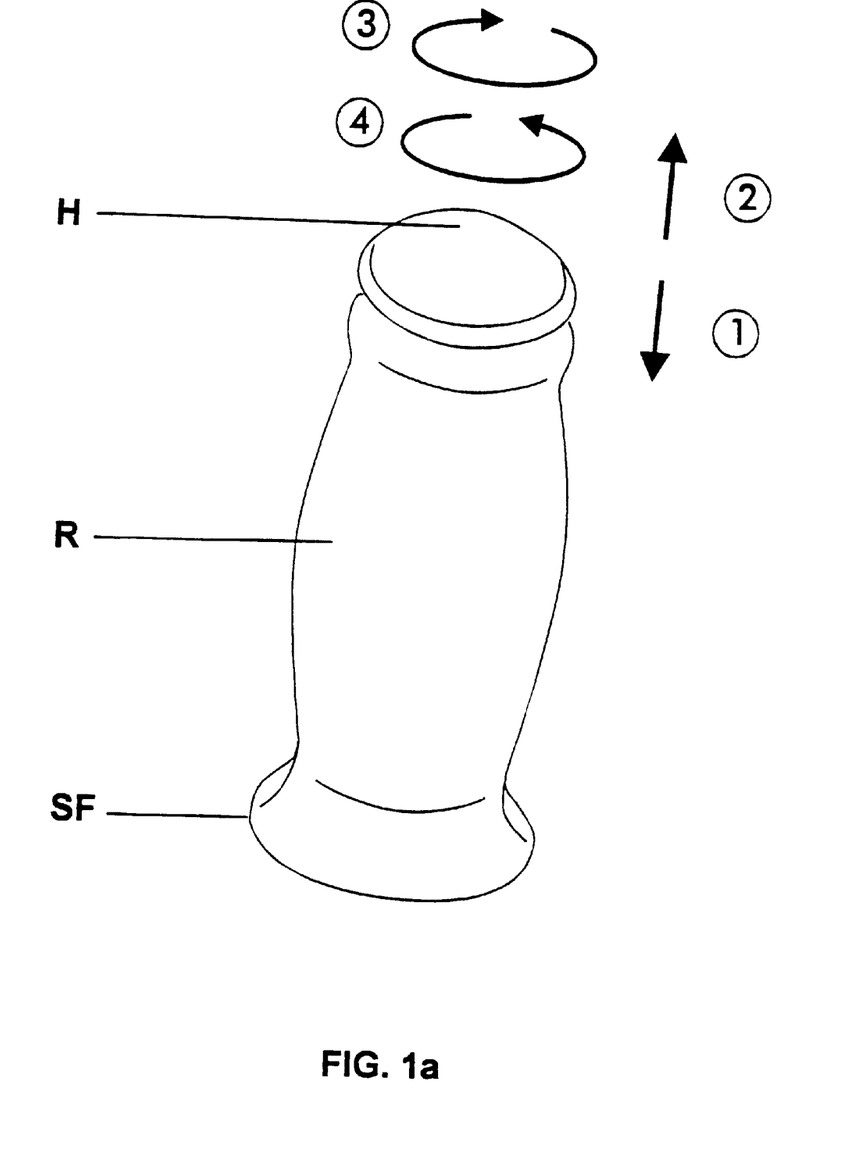
FIG. 1a is a perspective view of an input device according to a first embodiment of the invention.
Figure 1B:
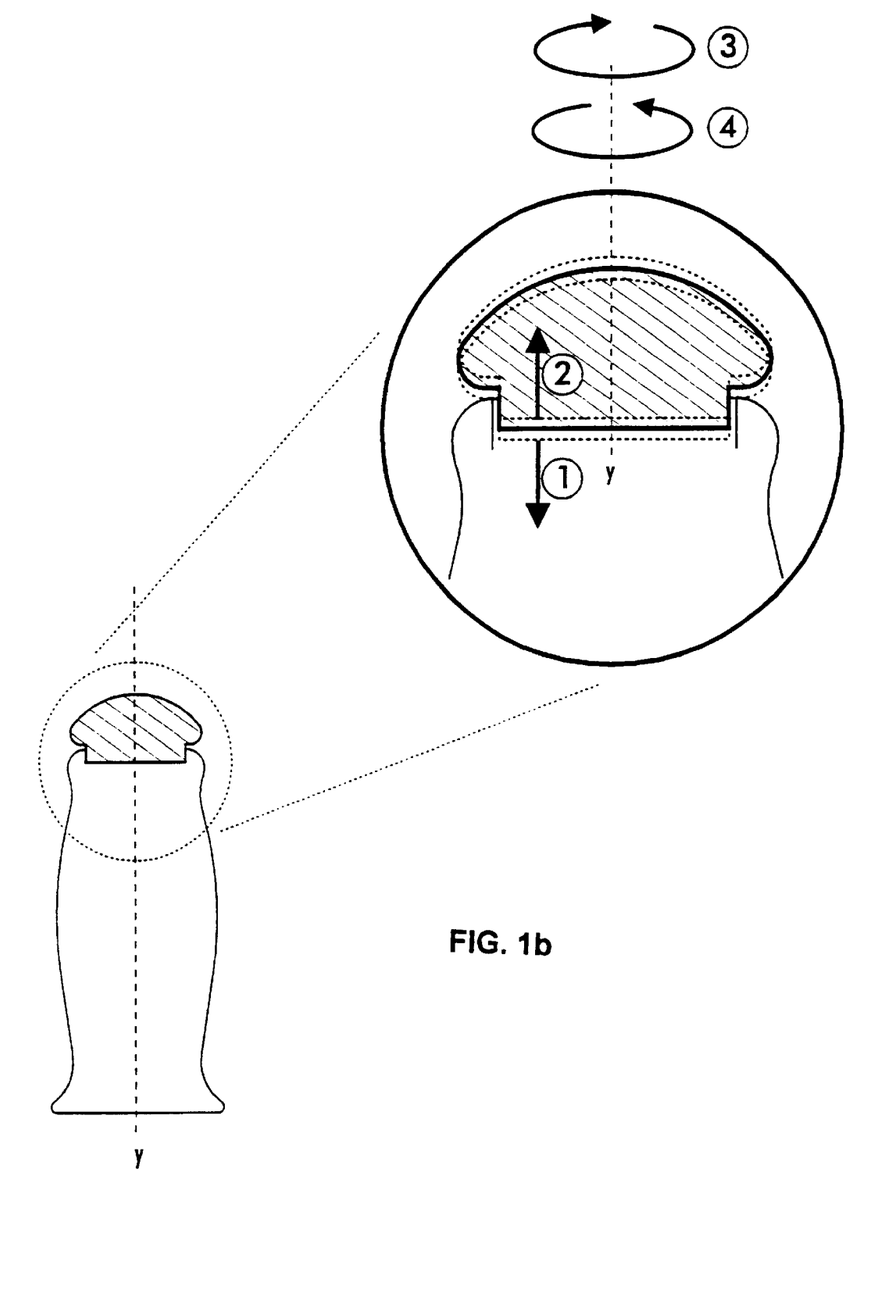
FIG. 1b is a partially sectioned view of the input device according to the first embodiment of the invention and an enlarged portion with the main operating element.

FIG. 1a shows a perspective view of an input device according to a first embodiment of the invention, while FIG. 1b is a partially sectioned view of this embodiment and a sectioned and enlarged portion with the main operating element H. The main operating element H, which is designed as a knob at the upper end of the body of rotation R, and the body of rotation R have to be distinguished. The housing of the input device is designed as a body of rotation R ergonomically adapted to the hand with a rotary knob H at its upper end, which can move axially as well as rotate, and a flat standing surface SF at its lower end. After axial movement the knob H springs back into a central rest position. The input device is held in one hand. The main operating functions can be actuated by the thumb and index finger of this hand. These are in particular the rotation of the knob in both directions without limit (right rotation: Function 3, left rotation: Function 4), as well as pressing (Function 1) or pulling (Function 2) the knob H in the axial direction, i.e. in the direction of the y-axis indicated in FIG. 1b by a dashed line.

Figure 2A:
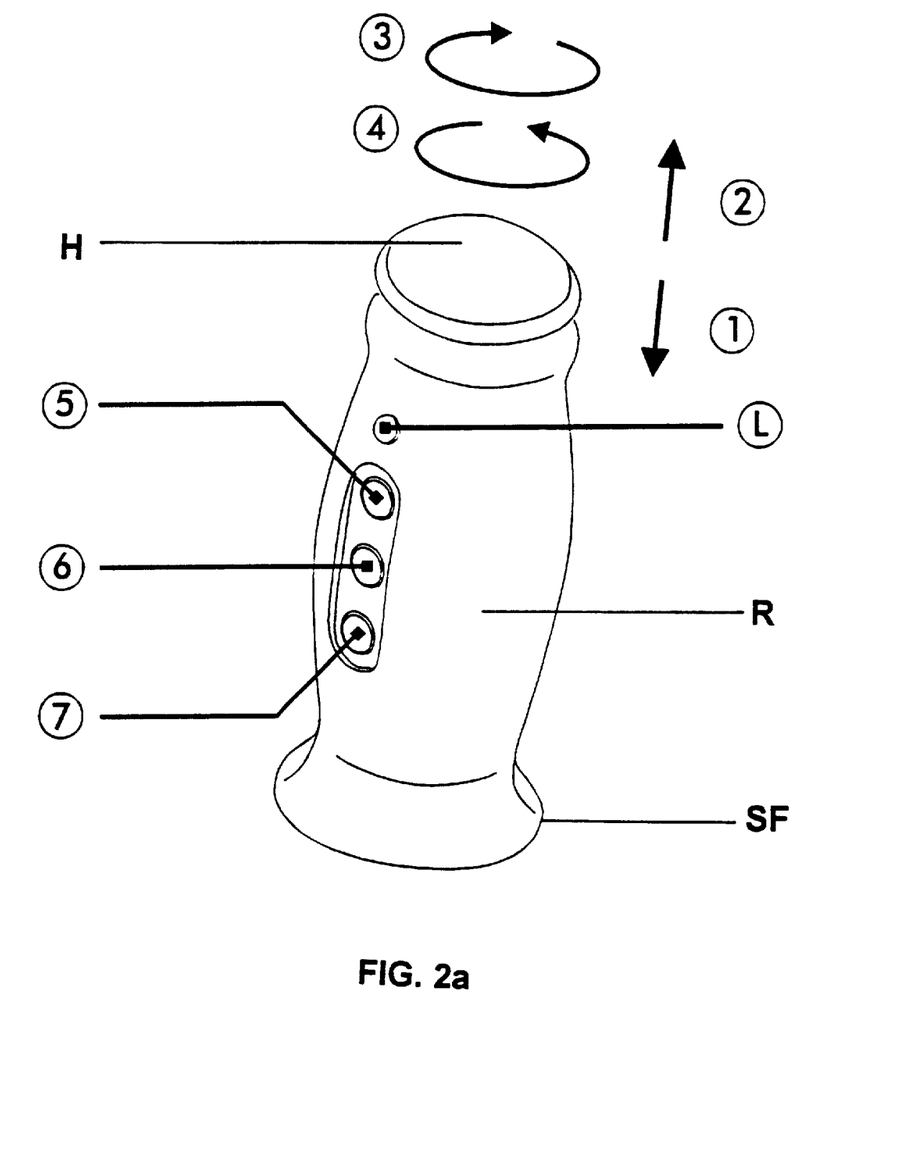
FIG. 2a is a perspective view of an input device according to a second embodiment of the invention.
Figure 2B:
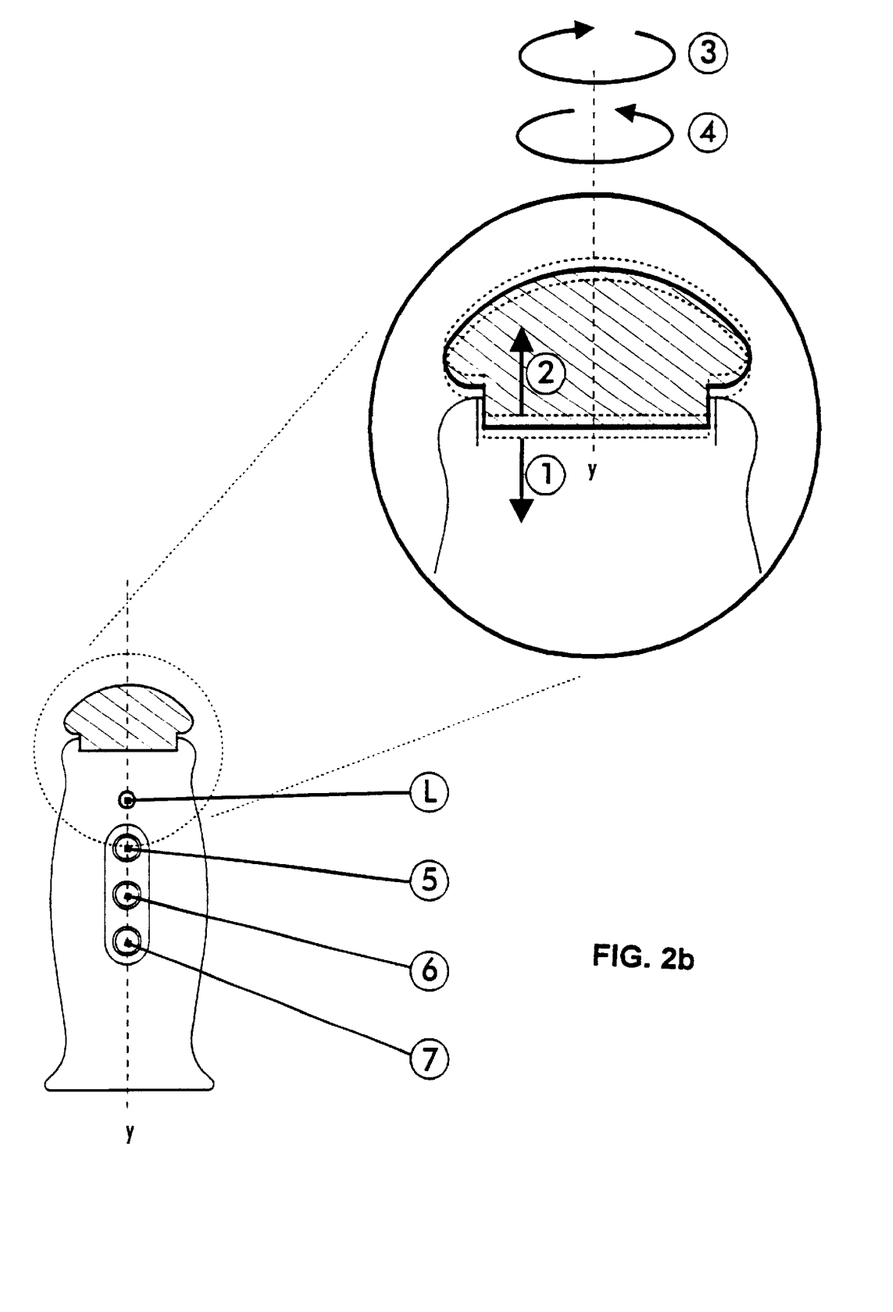
FIG. 2b is a partially sectioned view of the input device according to the second embodiment of the invention and an enlarged portion with the main operating element.

In the second embodiment of the input device shown in FIGS. 2a and 2b the region of the body of rotation not covered by the holding hand has in addition to the first embodiment a field with 3 keys (Functions 5, 6 and 7), which can be operated by the free hand, in order to call up less frequently required special functions. Furthermore a switch L is provided in this embodiment for actuating a laser pointer.

Figure 3:
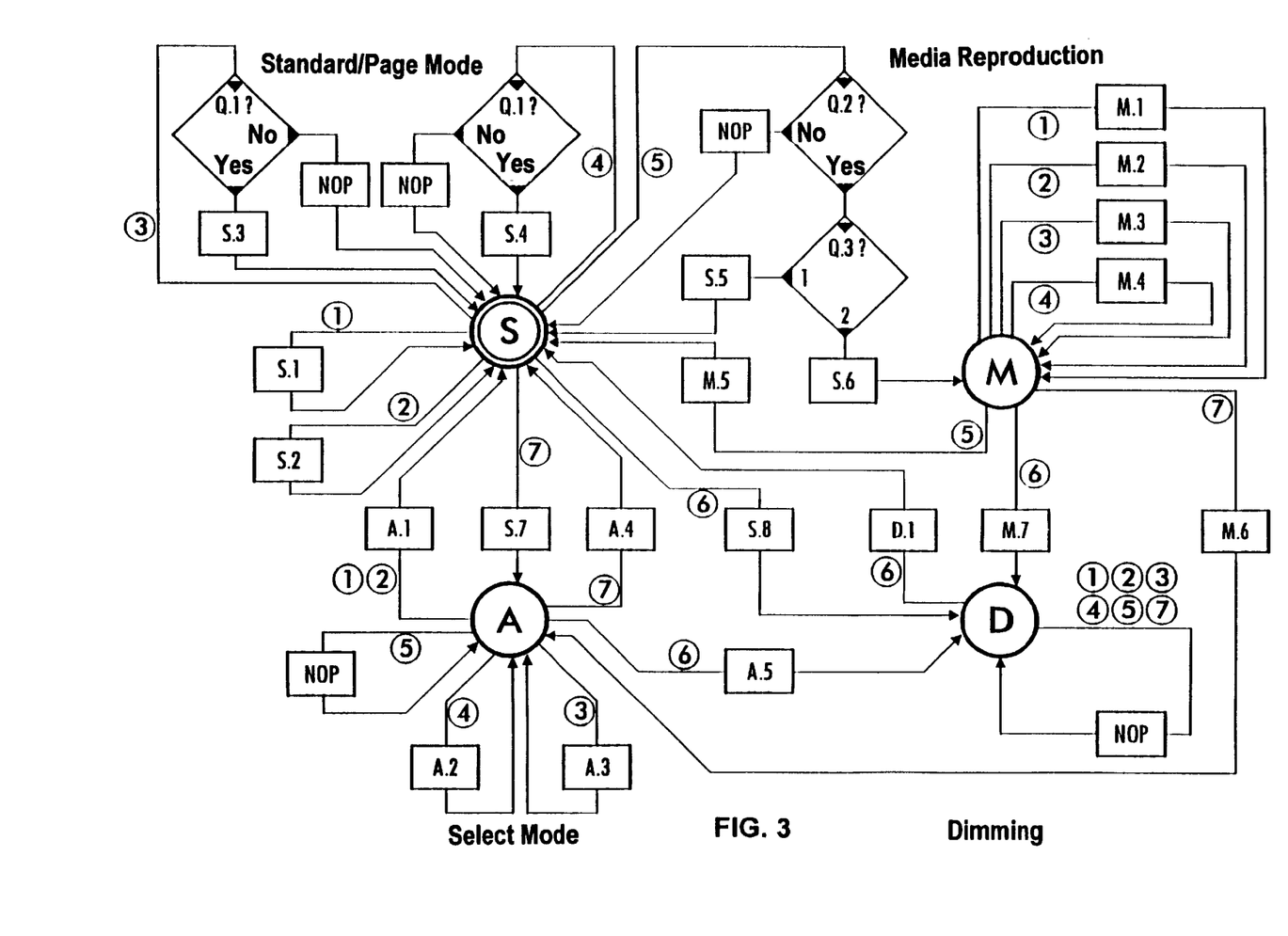
FIG. 3 is a diagram which describes the control of an electronic presentation with the input device according to the second embodiment of the invention.

A method is documented in the state diagram of FIG. 3, with which the input device according to the invention is coupled to a software-controlled presentation system. The presentation system has four states S, A, M and D, in which specific actions are associated with the switching signals of FIGS. 1a, 1b, 2a and 2b.

The state diagram in FIG. 3 relates to an input device according to the invention of the second embodiment with additional special function keys. As a concrete case it concerns three keys, which can be arranged in accordance with FIGS. 2a and 2b. The changes from one state to another are triggered by input of a symbol from the input alphabet. To the input alphabet there pertain the symbols {1, 2, 3, 4, 5, 6, 7, L} though "L" is not evaluated by the system in this variant and thus remains ignored. FIGS. 2a and 2b document the operating elements on the input device which send the respective symbols. If one of these symbols is entered a switching operation is triggered and the system changes from the current state to the following state. The following state is reached via the arrow against which the respective input symbol is placed. If several symbols are placed beside an arrow, the corresponding following state can be arrived at via any of these states ("OR" combination). On each switching operation the output function marked on the arrow is triggered. "NOP" means that no operation is carried out. With some switching operations there are branching possibilities. After checking the condition a branch is made to the corresponding branch. As a rule the presentation system starts in the start state S.

The software produces the relationship of all presentation pages. In each case the pages are arranged linearly one after the other like a film strip. A summary of individual pages in chapters is possible, in that a chapter is associated with individual regions on the "film strip" and if desired an automatic jump is defined at the end of a sub-region. Pages with different jump/depth possibilities can be realized, so that for example technical aspects can be jumped to for a marketing-orientated audience. The navigation within the presentation takes place as follows: With the aid of Function 1 of the input device (pressing the knob in the axial direction) the currently next page can be selected discontinuously. Function 2 (pulling the knob in the axial direction) switches to the currently preceding page.

The Functions 3, 4 (forwards/backwards rotation of the knob) serve as a rule to control the page content (e.g. making a selection between several buttons, fast forward/rewind of moving pictures, control of viewing direction in a virtual 3D world, varying values in diagrams). A switch is made from the current page to the selection mode by means of Function 7 (lower key of the key field). Any optional page from the whole presentation can be selected here very quickly and reliably by means of the Functions 3, 4 (rotation of the knob). Function 1 or 2 continues the presentation to the selected page and the selection mode is terminated. Function 7 terminates the selection mode and returns to the current page. Function 5 (pressing the upper key of the key field) initiates the action shown by the active button (e.g. jump to another chapter or another page, start motion picture sequences, start a sound event). Function 6 (pressing the middle key of the key field) is provided for special functions (e.g. dimming the presentation screen).

There first follows, for the detailed description of the state diagram of an input device according to the second embodiment, which describes the control of an electronic presentation and is shown schematically in FIG. 3, a detailed description of the input functions with explanations.

Function 1 and Function 2: Pressing 1 or pulling 2 the knob. On reaching the respective threshold the signal "knob pressed" 1 or "knob pulled" 2 is transmitted to the receiver. (Option: After attaining the rest position the signal "rest position" is sent once).

Function 3 and Function 4:

Rotation of the knob in the respective direction 3 or 4. The knob is based on a raster with constant angular resolution. On passing a raster step a signal ("rotation right" for 3 or "rotation left" for 4) is immediately sent. With continuous rotation a series of signals is accordingly sent. The knob has no limit position.

Functions 5 6 and 7:

Pressing a knob in the special operating field. After pressing and reaching the threshold a signal is sent. (Option: After reaching the rest position the signal "rest position" is sent once).

Function L:

Laser pointer. The laser pointer is on with the knob pressed, off in the rest position of the knob. The laser pointer knob L is directly connected to the laser unit. The design can be such that it either sends a signal like Function 5, 6 or 7 or it is not coupled to the system and only switches the laser unit.

A detailed functional description of the state diagram of FIG. 3 is given in the following. The output functions which are triggered by the input functions 1 . . . 7 are described. The output functions S.1 . . . S.8, A.1 . . . A.5, M. 1 . . . M.7, D. 1 relate to the state diagram of FIG. 3. There are four states S (page mode), A (selection mode), M (media reproduction) and D (dimming). The input functions 1 . . . 7 of the input device initiate different functions, depending on the current state.

State S—Standard/Page Mode:

The page mode: This is the standard state. The individual presentation pages are here shown in full picture size. This state serves for the actual presentation of the contents. The most important functions of switching forward and switching back can be attained directly.

A presentation page can also include a motion picture or be enhanced with audio information. The content of a presentation page can in principle be arbitrary but controllable media, such as video or virtual reality scenes for example, should be reproduced via the media reproduction state M.

A page can optionally have a user parameter. This can be increased/decreased by turning the knob. The user should get a signal via a return channel when such a variable parameter is active, e.g. through a graphical signal on the presentation page. The following scenarios can be realised through the user parameter:

The presenter can present a page interactively. For example he presents a diagram: By means of the user parameter he can alter the important variable of the diagram, so that the diagram immediately shows the new graph.

Object presentation: An object (e.g. three-dimensional representation of an automobile) can be rotated about the y-axis. The user parameter represent the angle from 0 to 360 .

Focus: Several regions/objects on the page can be graphically emphasized or enlarged. The presenter determines which place is to be emphasised through the user parameter.

Focus/Function triggering: A page can include several selection elements. They can be selected via the user parameter (the current selection is emphasised graphically). The function associated with the active selection element is triggered by the function key 5.

This can be a jump to a specified page for example or the reproduction of a video. The possibilities of influence which the user parameter has on the current page is determined by the concept of the current presentation. The presenter merely knows from the feedback that interaction is possible in addition to the forward/back switching. The presenter obtains a unified and simple tool from the parameter alteration by means of the rotary knob H, with which he can undertake inputs rapidly and precisely. The object of the graphical designer in the production of the presentation to take account of the unified picture appearance.

S.1—Next Picture

Switching forward. The following picture is shown; if a picture consists of several steps, the next step is shown.

S.2—Previous Picture

Switching back. The previous picture is shown; if a picture consists of several steps, the previous step is shown.

S.3—Reduce Parameter

Lowers the user parameter of the current page. The result is dependent on the page content and can for example be: (a) set the focus on the previous selection element; or: (b) reduce the value in a diagram.

The parameter is limited to an interval. On attaining the boundary of the interval the value either jumps to the opposite interval boundary or remains at the boundary.

S.4—Increase Parameter

Increases the user parameter of the current page. The result is dependent on the page content and can for example be: (a) set the focus on the next selection element; or: (b) increase the value in a diagram.

The parameter is limited to an interval. On attaining the boundary of the interval the value either jumps to the opposite interval boundary or remains at the boundary.

S.5—Jump to Page

Jumps to the page which is described by the selection element emphasised by the focus.

S.6—Media Reproduction

Switches to the media reproduction state. The element is reproduced which is described by the focused selection element. This should involve media elements which allow interaction. Examples: videoclip (Interaction: fast forward and rewind, pause, play) or virtual reality scenes (Interaction: rotate direction of view).

S.7—Selection Mode On

Switches to the selection mode. The current page is selected in the preview.

S.8 - Switch picture output to black Switches the output picture to black.

State A—Selection Mode:

Information for the selection mode: The selection mode offers a page preview in an arbitrary graphical representation. What matters is that the page preview allows the presenter to select any arbitrary page of the presentation. While the current page is still shown large, a smaller region on the display is reserved for the page preview, through which the presenter can see his new selection. Since all pages are arranged linearly by the linking, operation of the rotary function of the knob H suffices to implement the selection.

A.1—Jump to Selected Page. Selection Mode Off.

The presentation jumps to the selected page and leaves the selection mode.

A.2—Select Next Page in the Preview.

Selects next page in the page preview.

A.3—Select Previous Page in the Preview.

Selects previous page in the page preview.

A.4—Selection Mode Off

Leaves the preview mode. The current page remains displayed (no jump).

A.5—Selection Mode Off. Display Black.

Leaves the selection mode without a jump. The output picture is switched to black.

State M—Media Reproduction:

The media reproduction: The media reproduction state associates the input functions 1 and 2 to other actions. The next/back switching is deactivated. Return to the standard page mode is possible with the function key 5. By blocking the next/back switching the whole knob H is available for controlling the media reproduction. Which function is actually initiated depends on the medium itself. As examples the media "video" and "3D virtual reality scenes" are described in the following description.

M.1—Y-axis: Negative Pulse

Sends negative Y pulse to the medium reproduction control. Use dependent on the medium type. Examples: Pause/continue play for video; direct view down with virtual reality scene.

M.2—Y-axis: Positive Pulse

Sends positive Y pulse to the medium reproduction control. Use dependent on the medium type. Examples: Pause/continue play for video; direct view up with virtual reality scene.

M.3—X-axis: Negative Pulse

Sends negative X pulse to the medium reproduction control. Use dependent on the medium type. Examples: Fast rewind for video; move view to left with virtual reality scene.

M.4—X-axis: Positive Pulse Sends positive X pulse to the medium reproduction control. Use dependent on the medium type. Examples: Fast forward for video; move view to right with virtual reality scene.

M.5—Media Reproduction Stop

Terminates media reproduction and shows the image which was displayed before the start of the media reproduction.

M.6—Media Reproduction Stop. Selection Mode On.

Same function as M.5, then switching on the selection mode.

M.7—Media Reproduction Stop. Picture Output Black.

Same function as M.5, then switching the output picture to black.

State D—Dimming

The dimming: When attention should be directed more strongly to the presenter—e.g. for a sudden question from the audience and following discussion—the image can be switched to black at any time.

D.1—Picture Output Normal

Dimming off. The current picture is displayed again.

Branching Q

Description of the three branches in state S:

Q.1—Possible Parameter Input [YES/NO]?

Determines whether the current page has a user parameter. Return value YES when manipulation of the user parameter is possible, NO otherwise.

Q.2—Focus on Selection Element [YES/NO]?

Determines whether a selection element is emphasised by the focus. Return value YES when this is the case, NO when no selection element is present or none is emphasised by the focus.

Q.3—Jump [1] or Media Reproduction [2]?

Determines whether the current selection element describes a jump to another page (return value 1) or should initiate the media reproduction (return value 2).

The states M and D should not be limited by the state diagram. Without loss of the existing, intuitive control logic the following variations for example could be useful:

Function 6 of state S initiates the change of the page representation to another language instead of dimming. State S is reached again. Both functions (dimming and change of language) can be realised simultaneously through additional information such as duration of actuation. Function 6 should be open for special applications, which are set out here as examples.

Selection elements which are selectable for specific pages in the S state are not restricted to initiating only a jump or media reproduction. Further branches than Q.3 are conceivable. For example external hardware could be controlled (e.g. via the serial port), e.g.: switch on spotlights and direct them to the actual product. Q.3 will in each case branch either to M or to S.

The M state should document that fact that an X/Y control—slightly restricted—can be effected with the input apparatus. As can be seen from the diagram, X and Y pulses are merely issued to the control from the knob H. The evaluation of this input is dependent on the currently displayed media element and must be implement correspondingly (e.g. video control, virtual reality control).

Figure 4:
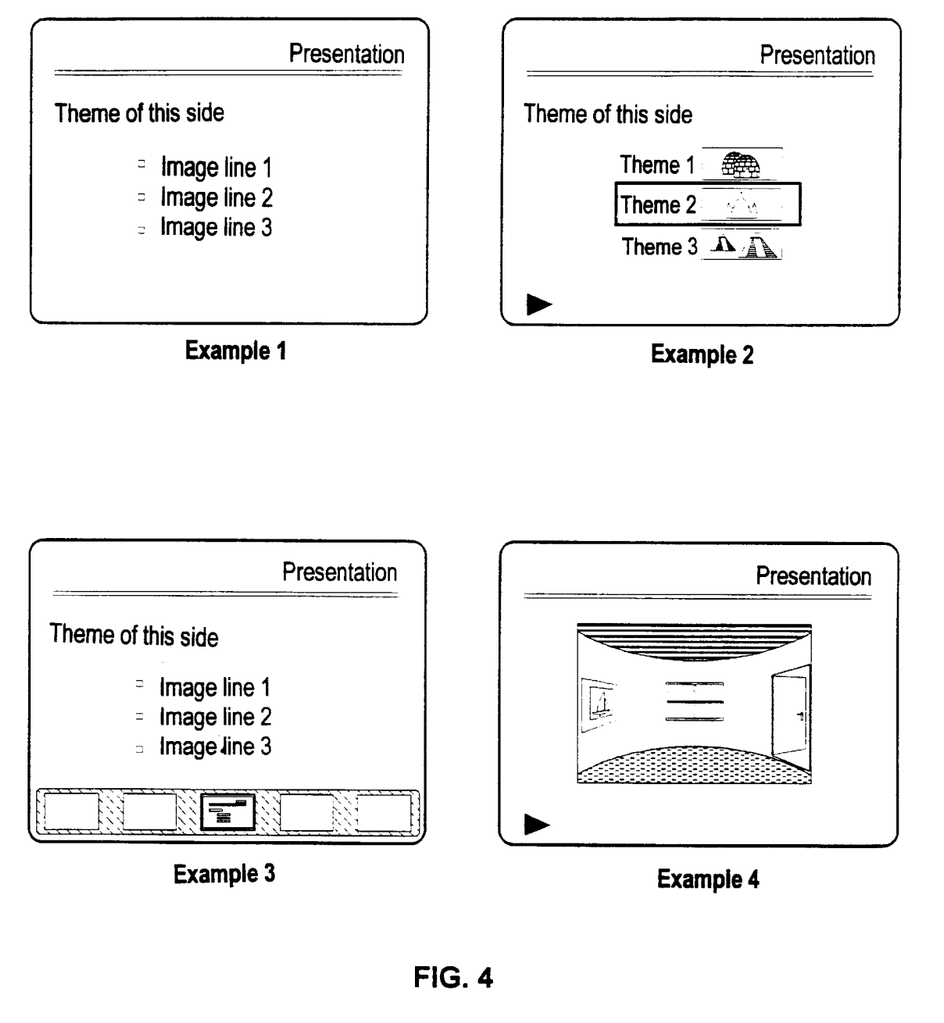
FIG. 4 show four layout examples for graphical conversion of presentation pictures corresponding to the method described by the state diagram of FIG. 3.

FIG. 4 shows four layout examples for the graphical conversion of the presentation pictures in accordance with the method described by the state diagram of FIG. 3.

EXAMPLE 1

A standard page without a moving image. The presentation is in state S.

EXAMPLE 2

Likewise a page in state S. However the presenter is given the information that the main element H is activated for the rotational movement (user parameter can be varied). In this example that occurs through the optical feedback channel, i.e. it is a symbol (here a triangle in the left lower corner) merged on to the screen. In this example the focus is on "Theme 2". The focus can obviously be moved between the three themes 1 to 3. Each of these three selection elements can effect a jump to another page or switch into the media reproduction state.

EXAMPLE 3

The presentation is in state A. The presenter can see five reduced images of his presentation at the lower edge. Firstly the preview of the current page is in the middle, the respective preceding/following pages before/after it. By turning the main control element H the presenter can move along the whole linearly arranged presentation and jump directly to a specific page.

EXAMPLE 4

The presentation is in state M. The picture in the middle can be a virtual reality scene. The presenter can alter the angle of view with the main control element H (turning and pressing/pulling), as further documented above.

Finally it should be expressly be made clear that the use of the input device according to the invention is not limited to its use in electronic presentations, rather that it can also be used, depending on the software employed, for remote control of other, simple and combined recording and reproducing systems for pictures and sound, such as television sets, audio and video systems, slide projectors and the like.

Its advantages, such as simplicity of operation and exclusion of error operations through a single main control element, which is actuated by a rotary and a linear movement, operability without a visual check of the input device, operability when put down and ergonomic form likewise come into play, as in the described example of use in an electronic presentation.

What is claimed is:

1. An input device for remote control of simple and combined recording and reproducing systems for pictures and sound as well as of presentation devices, the device comprising:

a housing;

a voltage supply;

a rotary knob arranged at the upper end of the housing and operating as a body of rotation, wherein the knob can be rotated without a stop to the left and to the right and is based on a raster with constant angular resolution, the rotation triggering a corresponding predetermined signal on passing each predetermined raster step of the body of rotation, the knob also operating as a push and pull knob in the direction of the axis of the body of rotation;

a signal element;

a plurality of switching elements, which respond to the actuation of the at least one operating element and cause the signal element to issue a signal corresponding to the actuation;

the input device being shaped for holding in a hand and being actuatable by the operator with one hand; and the housing having at least one flat surface formed so that the device can be placed by an operator on any horizontal surface, actuated while on the surface, and easily removed from the surface.

2. A method of remotely controlling at least one electronic presentation device operated by a presenter, wherein the presenter presents to an audience a set of contents organized by pages, the method comprising:

arranging the pages unidimensionally, controlling the pages according to the unidimensional arrangement, providing a special function key by which, when it is actuated, selects and shows a special page as the next page of the presentation, and providing at least one page with an active user parameter which is selectable by a special function key for changing a variable parameter of the content of the page.

3. A method according to claim 2, wherein the feedback as to the state of the electronic presentation is shown in a projection representation of the contents, which is presented to the audience by the electronic presentation device.

4. A method according to claim 2, wherein the feedback as to the state of the electronic presentation is shown on another output apparatus which can only be seen by the presenter.

5. A method according to claim 2, wherein an active user parameter of the current page is characterized by a graphical symbol.

6. A method according to claim 2, wherein the unidimensional series of pages can be run through by a special function key, while the presented page remains unchanged, and a page can be selected and shown as the next page of the presentation.

7. A method according to claim 2, wherein other functions are associated with a rotary movement and the linear movement of the main control element by actuation of a special function.

8. A method according to claim 2, wherein a change of the page representation into an other language is effected by actuation of a special function key.

9. A method of remotely controlling at least one electronic presentation device operated by a presenter, by input device, wherein the presenter presents to an audience a set of contents organized by pages, the method comprising the steps of arranging the pages unidimensionally, controlling the pages according to the unidimensional arrangement, receiving direct feedback through the at least one presentation device as to the state of the electronic presentation, and controlling the presentation in response to the direct feedback, wherein interaction and forward/back switching is possible, without visually checking the input device.

10. A method according to claim 9, wherein the control of the contents arranged according to pages takes place discontinuously.

11. A method according to claim 9, wherein the feedback as to the state of the electronic presentation is shown in a projection representation of the contents, which is presented to the audience by the electronic presentation device.

12. A method according to claim 9, wherein the feedback as to the state of the electronic presentation is shown on another output apparatus which can only be seen by the presenter.

13. A method according to claim 9, wherein an active user parameter of the current page is characterized by a graphical symbol.

14. A method according to claim 9, wherein the unidimensional series of pages can be run through by actuating a special function key, while the presented page remains unchanged, and a page can be selected and shown as the next page of the presentation.

15. A method according to claim 9, wherein other functions are associated with the rotary movement and the linear movement of the main control element by actuation of a special function key.

16. A method according to claim 9, where a change of the page representation into another language is effected by actuation of a special function key.

* * * * *